United States Patent
Sun et al.

(10) Patent No.: US 12,242,477 B2
(45) Date of Patent: Mar. 4, 2025

(54) SEMANTIC SEARCH BASED ON A GRAPH DATABASE

(71) Applicant: International Business Machines Corporation, Armonk, NY (US)

(72) Inventors: Teng Sun, Beijing (CN); Tong Liu, Xi'an (CN); Si Tong Zhao, Xi'an (CN); XueLiang Zhao, Shanghai (CN); Frank Feng, Beijing (CN); Yu Zui Wy You, Beijing (CN); Zhong Fang Yuan, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 17/467,516

(22) Filed: Sep. 7, 2021

(65) Prior Publication Data

US 2023/0076923 A1    Mar. 9, 2023

(51) Int. Cl.
| | |
|---|---|
| *G06F 16/2453* | (2019.01) |
| *G06F 16/21* | (2019.01) |
| *G06F 16/242* | (2019.01) |
| *G06F 16/901* | (2019.01) |
| *G06N 20/00* | (2019.01) |

(52) U.S. Cl.
CPC ...... *G06F 16/24542* (2019.01); *G06F 16/212* (2019.01); *G06F 16/243* (2019.01); *G06F 16/9024* (2019.01); *G06N 20/00* (2019.01)

(58) Field of Classification Search
CPC ............. G06F 16/24542; G06F 16/243; G06F 16/212; G06F 16/9024; G06N 20/00
See application file for complete search history.

(56) References Cited

U.S. PATENT DOCUMENTS

| | | | |
|---|---|---|---|
| 10,599,780 B2 | 3/2020 | Bacarella et al. | |
| 2002/0116196 A1* | 8/2002 | Tran | G06F 1/3203 |
| | | | 704/E15.045 |
| 2017/0083569 A1 | 3/2017 | Boguraev et al. | |
| 2017/0083615 A1 | 3/2017 | Boguraev et al. | |

(Continued)

FOREIGN PATENT DOCUMENTS

| | | |
|---|---|---|
| CN | 110377715 A | 10/2019 |
| CN | 111309863 A | 6/2020 |
| WO | 2019027546 A1 | 2/2019 |

OTHER PUBLICATIONS

Kutuzov ("Learning Graph Embeddings from WordNet-based Similarity Measures", Proceedings of the Eighth Joint Conference on Lexical and Computational Semantics, pp. 125-125, Jun. 6, 2019) (Year: 2019).*

(Continued)

*Primary Examiner* — Apu M Mofiz
*Assistant Examiner* — Farhad Agharahimi
(74) *Attorney, Agent, or Firm* — Yee & Associates, P.C.

(57) ABSTRACT

In order to perform a semantic search based on a graph database, sets of nodes are selected from a plurality of nodes in a graph database. A set of nodes semantically matches a keyword in a natural language query. At least one target node is identified in the sets of nodes. A path is selected from candidate paths based on similarities between the candidate paths and a plurality of paths in the graph database. A graph query for retrieving information from the graph database is generated based on the selected path and the query target.

20 Claims, 6 Drawing Sheets

(56) References Cited

U.S. PATENT DOCUMENTS

| | | | |
|---|---|---|---|
| 2017/0161262 A1* | 6/2017 | Bhatt | G06F 40/237 |
| 2019/0377759 A1* | 12/2019 | Lo | G06F 16/2445 |
| 2020/0272658 A1* | 8/2020 | . | G06N 20/00 |
| 2021/0124782 A1* | 4/2021 | Karaca | G06F 16/90328 |
| 2022/0050840 A1* | 2/2022 | Parravicini | G06N 5/025 |

OTHER PUBLICATIONS

Kim et al., "Natural language to SQL: Where are we today?," Proceedings of the VLDB Endowment, vol. 13, No. 10, Jun. 2020, 14 pages, https://dl.acm.org/doi/abs/10.5555/3389133.3416230.

La Marca et al., "Google Makes The Difference With Semantic Search And Knowledge Graph," MediaBuzz, Jul. 2012, 2 pages, https://www.mediabuzz.com.sg/technologies-july-12/google-makes-the-difference-with-semantic-search-and-knowledge-graph.

Hu et al., "Answering Natural Language Questions by Subgraph Matching over Knowledge Graphs," IEEE, IEEE Transactions on Knowledge and Data Engineering, Oct. 26, 2017, 14 pages, https://ieeexplore.ieee.org/document/8085196.

Veer, "Using Named-Entity-Recognition in NLP based Data Search," babelfishing, May 7, 2018, 3 pages, https://dl.acm.org/doi/10.1145/3053733.

Mell et al., "The NIST Definition of Cloud Computing," Recommendations of the National Institute of Standards and Technology, U.S. Department of Commerce, Special Publication 800-145, Sep. 2011, 7 pages.

\* cited by examiner

SEMANTIC SEARCH BASED ON A GRAPH DATABASE

BACKGROUND

The present disclosure relates to graph databases, and more specifically, to a semantic searching based on a graph database.

In computing parlance, a "search" is a request for information based on a query. Queries are often input by users. Traditional searches, also referred to as "lexical" searches, are typically performed by looking for literal matches to words in the query. In contrast, a "semantic" search refers to a search performed based on a meaning of the query. Semantic searches can be more difficult and/or resource-intensive to perform than lexical searches, but can also allow for more relevant results.

A "graph database," sometimes known as a "knowledge graph," refers to a database that stores information using graph structures with nodes, edges, and properties to represent and store data.

SUMMARY

According to one embodiment of the present disclosure, there is provided a computer-implemented method. According to the method, one or more processors select sets of nodes from a plurality of nodes in a graph database, a set of nodes semantically matching a keyword in a natural language query. One or more processors identify at least one target node in the sets of nodes, the at least one target node corresponding to a query target determined from the natural language query. One or more processors select a path from candidate paths based on similarities between the candidate paths and a plurality of paths in the graph database, a candidate path at least traversing a target node of the at least one target node and at least one node from the sets of nodes, a path of the plurality of paths traversing a subset of the plurality of nodes. One or more processors generate a graph query for retrieving information from the graph database based on the selected path and the query target.

According to another embodiment of the present disclosure, there is provided a system. The system comprises a processing unit and a memory coupled to the processing unit. The memory stores instructions that, when executed by the processing unit, perform actions comprising: selecting sets of nodes from a plurality of nodes in a graph database, a set of nodes semantically matching a keyword in a natural language query; identifying at least one target node in the sets of nodes, the at least one target node corresponding to a query target determined from the natural language query; selecting a path from candidate paths based on similarities between the candidate paths and a plurality of paths in the graph database, a candidate path at least traversing a target node of the at least one target node and at least one node from the sets of nodes, a path of the plurality of paths traversing a subset of the plurality of nodes; and generating a graph query for retrieving information from the graph database based on the selected path and the query target.

According to yet another embodiment of the present disclosure, there is provided a computer program product. The computer program product is tangibly stored on non-transient machine-readable medium and comprises machine-executable instructions. The machine-executable instructions, when executed on a device, cause the device to perform actions comprising: selecting sets of nodes from a plurality of nodes in a graph database, a set of nodes semantically matching a keyword in a natural language query; identifying at least one target node in the sets of nodes, the at least one target node corresponding to a query target determined from the natural language query; selecting a path from candidate paths based on similarities between the candidate paths and a plurality of paths in the graph database, a candidate path at least traversing a target node of the at least one target node and at least one node from the sets of nodes, a path of the plurality of paths traversing a subset of the plurality of nodes; and generating a graph query for retrieving information from the graph database based on the selected path and the query target.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

Figure 1:
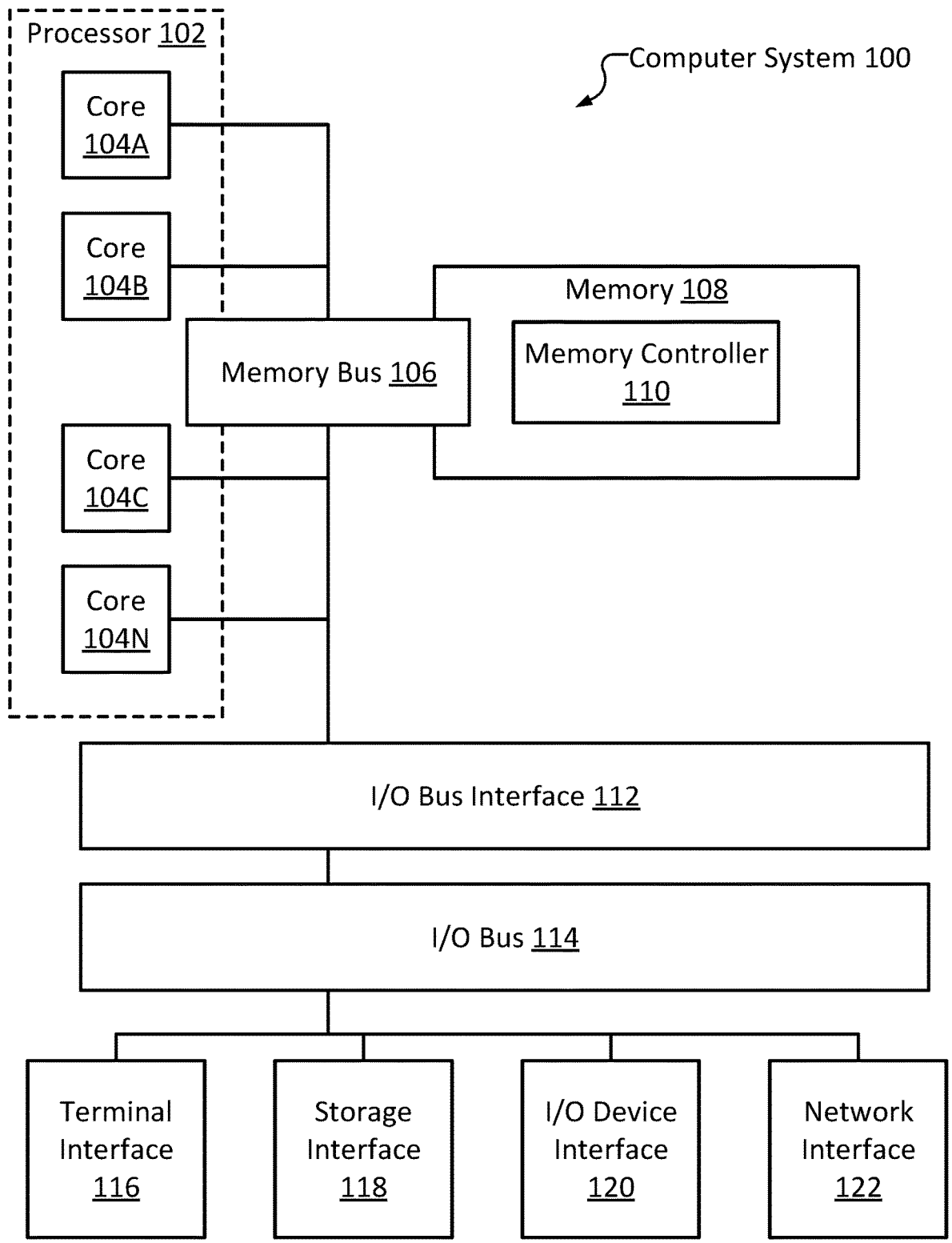
FIG. 1 illustrates a high-level block diagram of an example computer system that may be used in implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, shown is a high-level block diagram of an example computer system 100 that may be configured to perform various aspects of the present disclosure, including, for example, method 600. The example computer system 100 may be used in implementing one or more of the methods or modules, and any related functions or operations, described herein (e.g., using one or more processor circuits or computer processors of the computer), in accordance with embodiments of the present disclosure. In some embodiments, the major components of the computer system 100 may comprise one or more CPUs 102, a memory subsystem 108, a terminal interface 116, a storage interface 118, an I/O (Input/Output) device interface 120, and a network interface 122, all of which may be communicatively coupled, directly or indirectly, for inter-component communication via a memory bus 106, an I/O bus 114, and an I/O bus interface unit 112.

The computer system 100 may contain one or more general-purpose programmable processors 102 (such as central processing units (CPUs)), some or all of which may include one or more cores 104A, 104B, 104C, and 104N, herein generically referred to as the CPU 102. In some embodiments, the computer system 100 may contain multiple processors typical of a relatively large system; however, in other embodiments the computer system 100 may alternatively be a single CPU system. Each CPU 102 may execute instructions stored in the memory subsystem 108 on a CPU core 104 and may comprise one or more levels of on-board cache.

In some embodiments, the memory subsystem 108 may comprise a random-access semiconductor memory, storage device, or storage medium (either volatile or non-volatile) for storing data and programs. In some embodiments, the memory subsystem 108 may represent the entire virtual memory of the computer system 100 and may also include the virtual memory of other computer systems coupled to the computer system 100 or connected via a network. The memory subsystem 108 may be conceptually a single monolithic entity, but, in some embodiments, the memory subsystem 108 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 108 may contain elements for control and flow of memory used by the CPU 102. This may include a memory controller 110.

Although the memory bus 106 is shown in FIG. 1 as a single bus structure providing a direct communication path among the CPU 102, the memory subsystem 108, and the I/O bus interface 112, the memory bus 106 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 112 and the I/O bus 114 are shown as single respective units, the computer system 100 may, in some embodiments, contain multiple I/O bus interface units 112, multiple I/O buses 114, or both. Further, while multiple I/O interface units are shown, which separate the I/O bus 114 from various communications paths running to the various I/O devices, in other embodiments some or all of the I/O devices may be connected directly to one or more system I/O buses.

In some embodiments, the computer system 100 may be a multi-user mainframe computer system, a single-user system, or a server computer or similar device that has little or no direct user interface but receives requests from other computer systems (clients). Further, in some embodiments, the computer system 100 may be implemented as a desktop computer, portable computer, laptop or notebook computer, tablet computer, pocket computer, telephone, smart phone, mobile device, or any other appropriate type of electronic device.

It is noted that FIG. 1 is intended to depict the representative major components of an exemplary computer system 100. In some embodiments, however, individual components may have greater or lesser complexity than as represented in FIG. 1, components other than or in addition to those shown in FIG. 1 may be present, and the number, type, and configuration of such components may vary.

Figure 2:
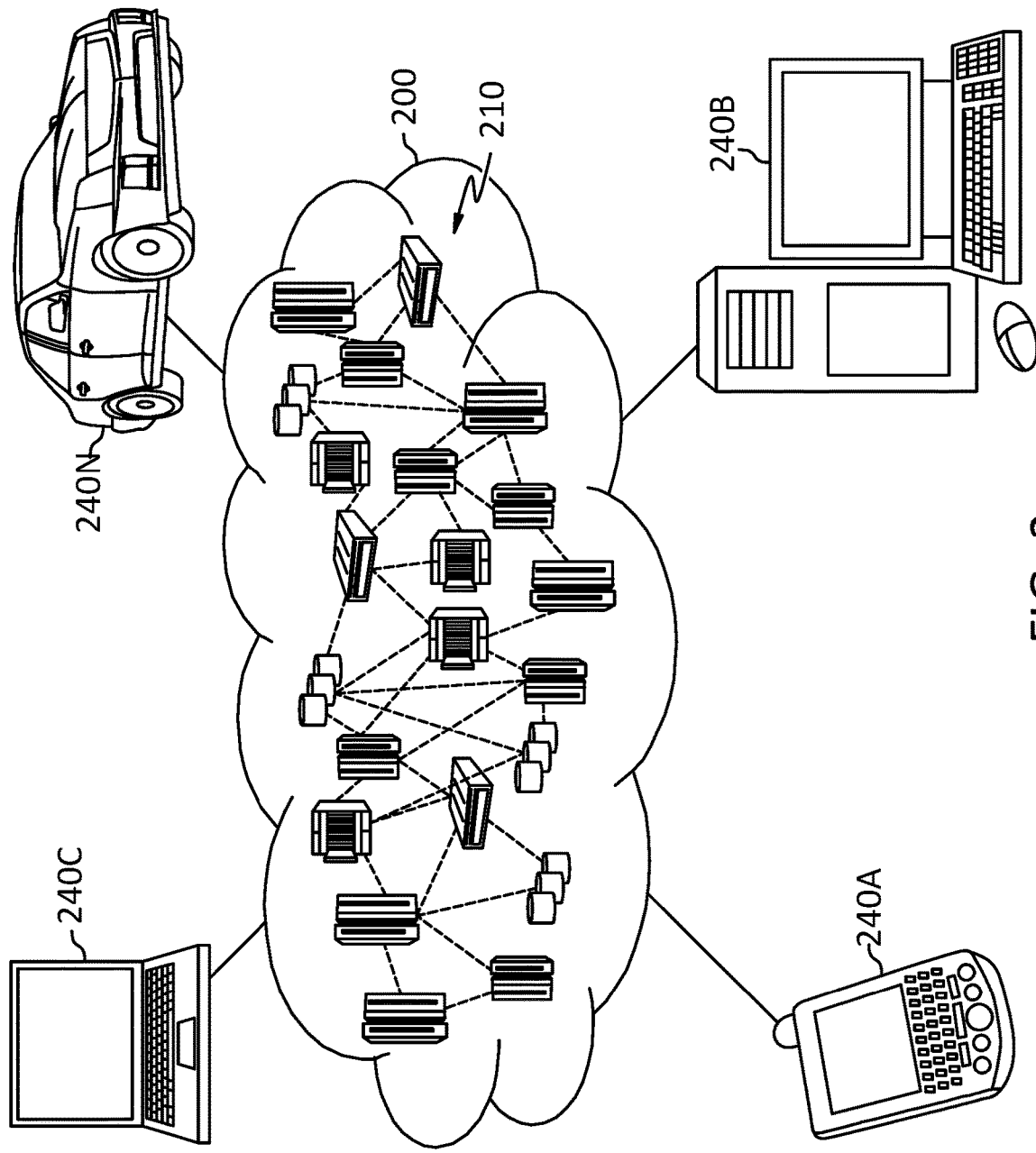
FIG. 2 depicts a cloud computing environment according to an embodiment of the present disclosure.

Referring now to FIG. 2, illustrative cloud computing environment 200 is depicted. As shown, cloud computing environment 200 comprises one or more cloud computing nodes 210 with which local computing devices used by cloud consumers, such as, for example, personal digital assistant (PDA) or cellular telephone 240A, desktop computer 240B, laptop computer 240C, and/or automobile computer system 240N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 240A-N shown in FIG. 2 are intended to be illustrative only and that computing nodes 210 and cloud computing environment 200 can communicate with any type of computerized device over any type of network and/or network addressable connection (e.g., using a web browser).

Figure 3:
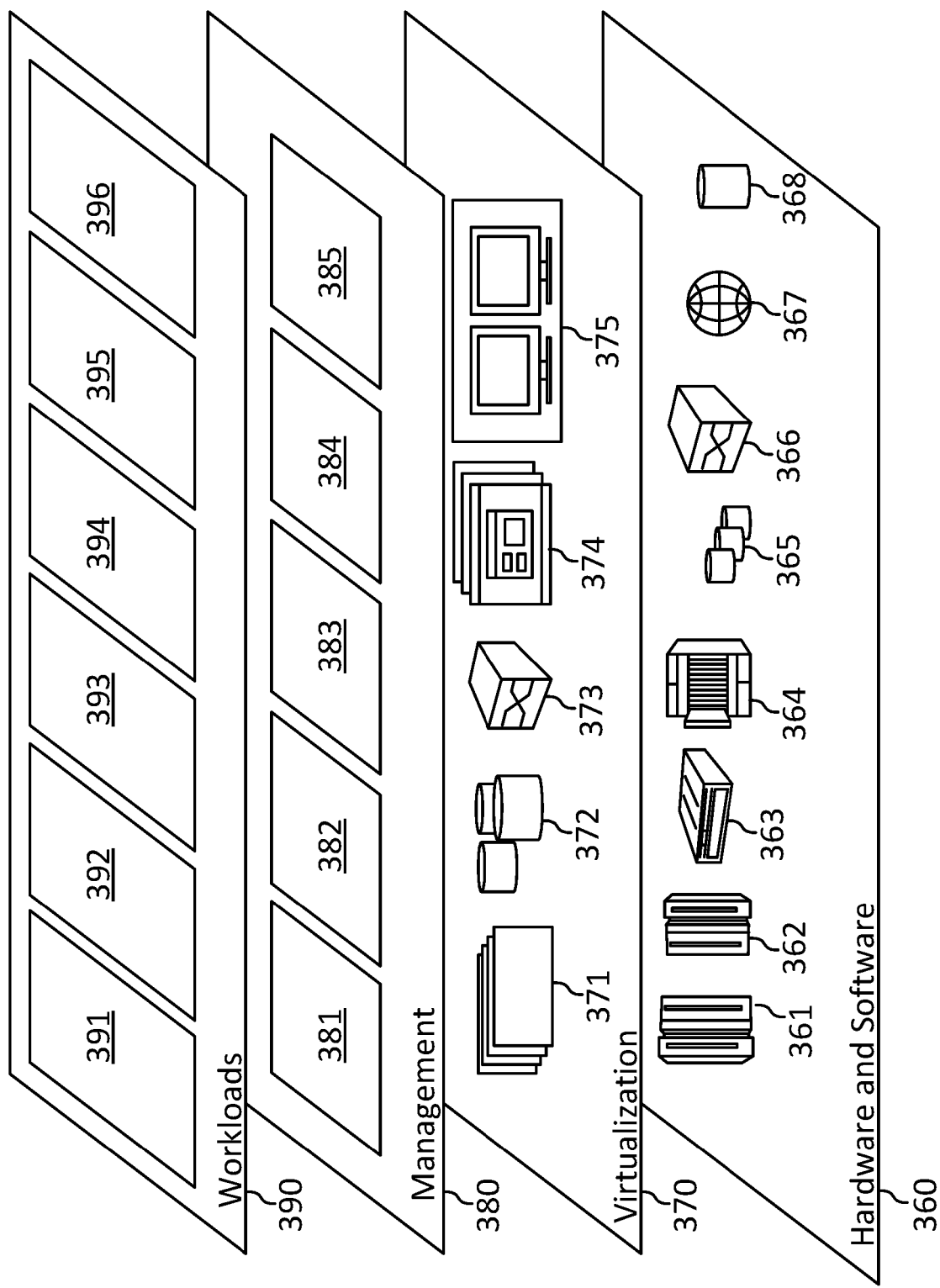
FIG. 3 depicts abstraction model layers according to an embodiment of the present disclosure.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and semantic search based on a graph database 396. Hereinafter, reference will be made to FIG. 4-6 to describe details of the semantic search based on a graph database 396.

In general applications of semantic search based on a graph database, such as question answering based on a graph database, users typically provide queries in the form of natural language. In order to return relevant results in response to such queries, systems may semantically analyze the natural language query to determine a graph query for retrieving information from the graph database. Traditionally, a large number of rules or complex neural network architectures are used to perform the conversion. However, setting a large number of rules may require substantial human labor, and it may be difficult to cover a large number of natural language queries using a limited number of rules. Moreover, the complex neural network architectures often provide limited improvement in the accuracy of semantic search and are also often relatively difficult to implement. Thus, a solution of converting natural language query to graph query for semantic search based on a graph database could be particularly advantageous.

In order to address the above and other potential problems, embodiments of the present disclosure provide a solution for semantic search based on a graph database. According to the solution, sets of nodes are selected from a plurality of nodes in a graph database. A set of nodes semantically match a keyword in a natural language query. At least one target node is identified in the sets of nodes, the at least one target node corresponding to a query target determined from the natural language query. A path is selected from candidate paths based on similarities between the candidate paths and a plurality of paths in the graph database. A candidate path at least traverses a target node of the at least one target node and at least one node from the sets of nodes. A path of the plurality of paths traverses a subset of the plurality of nodes. A graph query for retrieving information from the graph database is generated based on the selected path and the query target.

As such, this solution may enable determining a graph query based on a natural language query from users and retrieving information from a graph database using the determined graph query. Thus, the accuracy and efficiency of semantic search based on a graph database may be improved.

Figure 4:
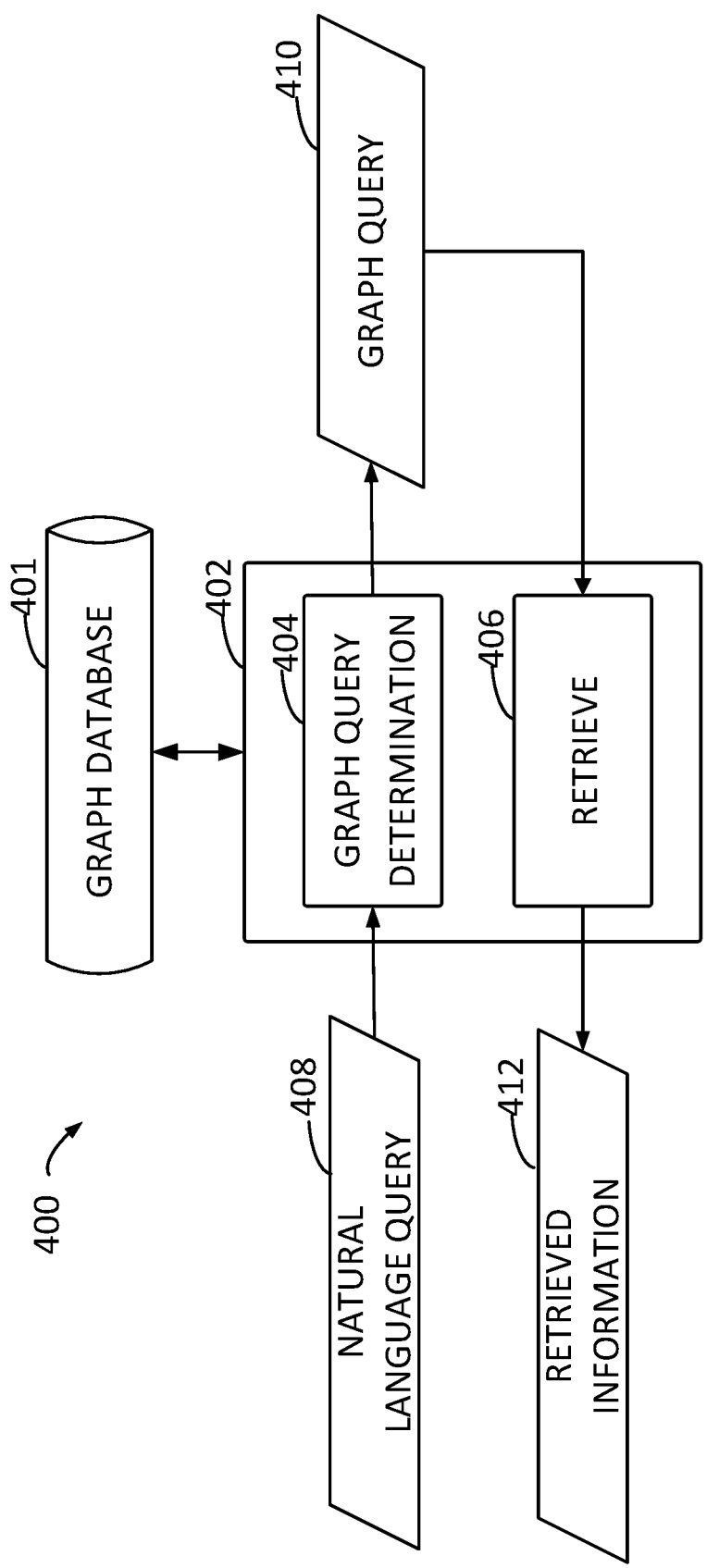
FIG. 4 depicts a computing environment for implementing the semantic search based on a graph database according to embodiments of the present disclosure.

With reference now to FIG. 4, a computing environment 400 in which embodiments of the present disclosure can be implemented is shown. It is to be understood that the elements of the environment 400 are described only for the purpose of illustration without suggesting any limitations as to the scope of the present disclosure. The embodiments of the present disclosure can be embodied with different elements. For example, at least part or all of the environment 400 may be implemented by computer system/server 100 of FIG. 1.

As shown in FIG. 4, the environment 400 may include a graph database 401 and a computing system 402. The graph database 401 is a database including nodes (also referred to as vertices), relationships (also referred to as edges), and properties of nodes and relationships to represent and store data. Examples of the graph database 401 may comprise Neo4j, ArangoDB, and OrientDB.

In the graph database 401, nodes may be used to store entities. A node may have a node name referring to an entity, a node label to describe a type of the entity, and a node property to describe an attribute of the entity. For example, the graph database 401 may have a first node named "New York" with a node label "city" and a node property "population." The name "New York" may also be a value of a node property "name." The graph database 401 may also have a second node named "New York" with a node label "state" and a node property "population."

Relationships in the graph database 401 may be used to store relations between entities. Relationships may be directed or undirected. Similarly, a relationship may have a relationship name referring to a relation, a relationship label to describe a type of the relation, and a relationship property to describe an attribute of the relation. For example, relationships may be used to store parent-child relations, actions, ownership, and the like. As an example, the graph database 401 may have a directed relationship named "has interest in" with a relationship label "has" and a relationship property "interest level."

In addition, the graph database 401 may have a "schema" to organize the plurality of nodes and relationships in the graph database 401. The schema may be used to define the node properties and node labels of the plurality of nodes and the relationship properties and relationship labels of a plurality of relationships in the graph database 401. For example, a node "Beijing" labeled "city" and a node "New York" labeled "city" may be grouped by a node label "city" in the schema. It is to be noted that the schema may not include specific nodes like "Beijing" or "New York." Instead, the schema may only include a node label "city."

In the graph database 401, a collection of nodes and relationships between the nodes may refer to a path (also referred to as graph). The path may relate the entities and the relations between the entities. For example, the graph database 401 may have a path relating a node representing "The Three Musketeers," a node representing "Alexandre Dumas," and a relationship representing "writes."

Based on interaction with the graph database 401, the computing system 402 may perform semantic search to retrieve information from the graph database 401. The computing system 402 may be implemented by computer system/server 100 of FIG. 1. The computing system 402 may include a graph query determination module 404 and a retrieve module 406. The graph query determination module 404 may receive a natural language query 408 and generate a graph query 410 based on the natural language query 408. The retrieve module 406 may use the generated graph query 410 to search the graph database 401 and obtain retrieved information 412 from the graph database 401.

The natural language query 408 may be a command for retrieving specific information from available resources. The natural language query 408 may be a question consisting only of words in the user's language. As an example, the natural language query 408 may be "employees who are male and over 30 years old in New York." As another example, the natural language query 408 may be "population of the capital of the United States." Notably, the natural language query 408 may not use or include a format or syntax that would make the query 408 recognizable by, for example, the retrieve module 406. In other words, directly submitting the natural language query 408 to the retrieve module 406 may result in the retrieve module 406 failing to retrieve retrieved information 412 from graph database 401.

The graph query 410 may be used to find certain nodes or relationships in the graph database 401. The graph query 410 may be a statement in a graph query language. For example, the graph query 410 may include a set of clauses combined in graph query syntax. The set of clauses may be used to define a query target corresponding to the natural language query 408. In addition, the set of clauses may be used to define a path corresponding to the natural language query 408. In addition or alternatively, the set of clauses may be used to define at least one constraint corresponding to the natural language query 408. Examples of the graph query language may comprise Cypher, Gremlin and SPARQL. As an example, the graph query 410 in Cypher may be as follows:

employee-city
MATCH
p=(n:employee)-[r:live in]->(c:city)
WHERE
n.age>30 AND n.gender=male AND c.name=New York
RETURN n Wherein the graph query 410 includes a MATCH clause defining the query path "p=(n:employee)-[r:live in]->(c:city)", a WHERE clause defining the constraints "n.age>30 AND n.gender=male AND c.name=New York" and a RETURN clause defining the query target "employee."

The retrieve module 406 may use the generated graph query 410 to search the graph database 401 and obtain retrieved information 412 from the graph database 401. The retrieved information 412 may be data items stored in the nodes and relationships corresponding to the graph query 410. For example, the retrieved information 412 corresponding to the exemplified graph query 410 may comprise data items related to employees who are male and over 30 years old in New York in the graph database 401.

As mentioned above, graph query determination module 404 to convert the natural language query 408 from a user to a graph query 410 for retrieving information from the graph database 401 efficiently. This conversion is described in further detail below, with reference to FIG. 5 and FIG. 6.

Figure 5:
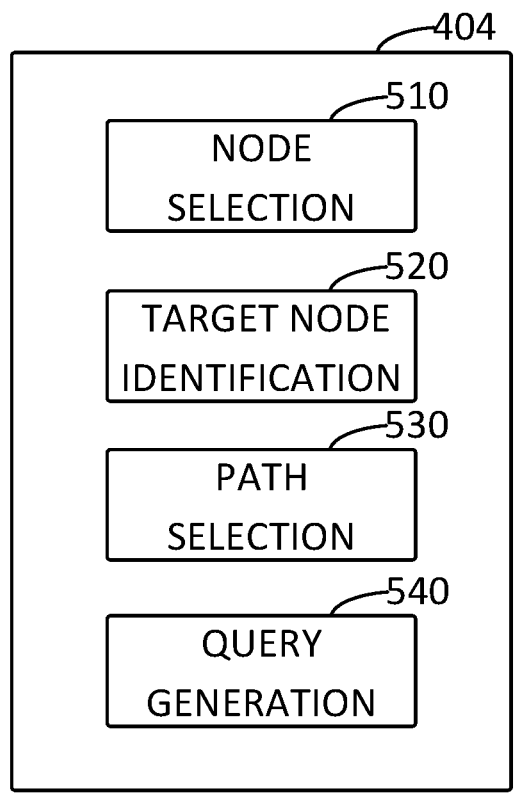
FIG. 5 depicts an example graph query determination module for determining a graph query according to embodiments of the present disclosure.

With reference now to FIG. 5, the graph query determination module 404 in which embodiments of the present disclosure can be implemented is shown. The graph query determination module 404 may facilitate the conversion of the natural language query 408 to the graph query 410. As described above, a computing system (such as, for example, computing system 402) provided with graph query 410 may perform more efficient semantic searches based on the graph database 401. It is to be understood that the structure and functionality of the graph query determination module 404 are described only for the purpose of illustration without suggesting any limitations as to the scope of the present disclosure. The embodiments of the present disclosure can be embodied with a different structure and/or functionality. At least part or all of the graph query determination module 404 may be implemented by computer system/server 100 of FIG. 1.

As shown in FIG. 5, the graph query determination module 404 may include a node selection module 510, a target node identification module 520, a path selection module 530 and a query generation module 540. The node selection module 510 may select sets of nodes from a plurality of nodes in the graph database 401. Sets of nodes may be selected based on semantically matching a keyword in the natural language query 410. Different selected sets of nodes may semantically match different keywords (i.e., a first selected set of nodes may semantically match a first keyword, a second selected set of nodes may semantically match a second keyword, etc.). As such, keywords in the natural language query 410 may be mapped to the corresponding nodes in the graph database 401. The mapped nodes may be used to represent the keywords in the natural language query 408 on a semantic level. In this case, the stored data items of these mapped nodes may be used to convert the keywords in the natural language 408 to clauses in the graph query 410.

Specifically, the node selection module 510 may identify keywords related to entities, attributes, relations or values in the natural language query 408. The keywords related to entities, attributes, relations or values may be identified by any suitable methods. In some embodiments, the keywords may be identified from the natural language query 408 using Name-entity Recognition (NER). The node selection module 510 may use NER to recognize words related to entities, attributes, relations or values and identify these words as the keywords in the natural language query 408. For example, for the exemplified natural language query 408 "employees who are male and over 30 years old in New York," words "employees," "male," "30," and "New York" may be identified as the keywords.

In some embodiments, the keywords may be identified based on a schema search. The keywords may be identified based on a semantic match between the words in the natural language query 408 and the schema of the graph database 401. The node selection module 510 may identify words semantically matching the node properties, node labels, relationship properties and relationship labels in the schema as the keywords. For example, the word "employees" in the natural language query 408 may be identified as a keyword due to a semantic match with a node label "employee" in the schema.

It is to be noted that the identified keywords may be different to the matched elements of nodes on a text level. A matched element of a node may be a matched node name, a matched node property, a matched node label, a matched relationship name of a relationship connected with the node, a matched relationship property of a relationship connected with the node, or a matched relationship label of a relationship connected with the node. For example, a word "car" in the natural language query 408 may be identified as a keyword due to a semantic match with a node label "automobile" in the schema. The semantic match may be implemented by various methods. Matching algorithms such as keyword matching, synonym matching, and fuzzy matching may be adopted to implement the semantic match.

In some embodiments, the node selection module 510 may identify the keywords based on a combination of entity recognition and schema search methods. The node selection module 510 may use an entity recognition method to recognize a set of entities and perform a semantic match between the recognized set of entities and the schema. The node selection module 510 may discard entities matching no labels or properties defined in the schema from the recognized set of entities to improve the accuracy of entity recognition. For example, the node selection module 510 may identify the word "employees" as a keyword and relate the keyword to a first entity "employee" and a second entity "employer" with different confidences. In the case where the schema of the graph database 401 does not include a node label "employer," the node selection module 510 may discard the second entity "employer." As such, the identification of keywords related to corresponding entities may be improved.

Based on the identified keywords in the natural language query 408, the node selection module 510 may select the sets of nodes semantically matching the keywords from the plurality of nodes in the graph database 401. In some embodiments, the node selection module 510 may select a set of nodes semantically matching a keyword by selecting nodes having at least one matched element corresponding to the keyword. In other words, for a keyword in the natural language query 408, the node selection module 510 may select any node having a matched node name, a matched node property, a matched node label, a matched relationship name of a relationship connected with the node, a matched relationship property of a relationship connected with the node, or a matched relationship label of a relationship connected with the node. For example, for the keyword "employees," a node named "Susan" with a label "employee" may be selected from the plurality of nodes in the graph database 401.

In some embodiments, the node selection module 510 may select the nodes having at least one matched element by performing a semantic match between the keywords and the plurality of nodes and relationships in the graph database 401. In other words, the node selection module 510 may directly select the sets of nodes based on the schema. In the cases where the node selection module 510 identifies words semantically matching the schema as the keywords, the node selection module 510 may select the sets of nodes having the matched elements of the schema. For example, the node selection module 510 may select all of the nodes labeled "employee" based on the semantic match between the keyword "employees" and the node label "employee" defined in the schema.

In some embodiments, the node selection module 510 may select the sets of nodes semantically matching the keywords further based on association between the keywords. The association between the keywords may be determined based on natural language analytics. Examples of the natural language analytics may comprise syntax analysis, part of speech analysis and the like. The node selection module 510 may use syntax analysis and/or speech analysis to bind words in the natural language query 408 into several phrases so as to determine the association between keywords. For example, for the exemplified natural language query 408 "employees who are male and over 30 years old in New York," the node selection module 510 may bind the words into a sequence of phrases comprising "employees," "who are male," "over 30 years old," and "in New York." Based on the words binding, the node selection module 510 may determine that the keyword "male" is associated with the keyword "employees." Moreover, the words binding may be used to determine the association between keywords related to values and keywords related to entities or attributes.

In some embodiments, the node selection module 510 may determine that a first keyword related to relations, attributes or values is associated with a second keyword related to entities in the natural language query 408 based on at least one of syntax analysis or part of speech analysis. The node selection module 510 may update the selected set of nodes corresponding to the first keyword using a number of nodes semantically matching both the first keyword and the second keyword. In other words, the associated keywords may be mapped to a same node. The node selection module 510 may refine the selected set of nodes corresponding to the first keyword based on the association between the first keyword and the second keyword.

For example, the first keyword "male" may semantically match a set of nodes having the node property value "male," such as nodes labeled "employee," "student," and "writer." However, based on the association between the second keyword "employees" and the first keyword "male," the node selection module 510 may only select nodes labeled "employee" from the matched set of nodes. In this way, the node selection module 510 may constrain the relations, attributes, or values related to the first keyword to the entities related to the associated second keyword instead of other unrelated entities in the graph database 401. As such, the node selection module 510 may select sets of nodes semantically matching keywords in the natural language query 408 more accurately.

It is to be appreciated that the term "a set of nodes" herein may refer to one or more nodes. In some embodiments, for each keyword in the natural language query 408, the node selection module 510 may select one or more nodes with corresponding confidences. The confidences may be determined based on the semantic matches between the keywords and the matched elements of the corresponding nodes. Additionally, the confidences may be determined based on the association between the keywords. For example, for the keyword "New York," the node selection module 510 may select a node "New York" labeled "city" with a confidence 0.9 and select a node "The New York Times" labeled "newspaper" with a confidence 0.4.

In some embodiments, the node selection module 510 may select a node with the highest confidence as the optimal node corresponding to the keyword. Thus, the matched element of the optimal node may be used to represent the keyword. The graph query determination module 404 may generate the graph query 410 based on the matched element of the optimal node. For example, the graph query determination module 404 may use the node label "employee" to represent the keyword "employees" and the node name "New York" of a node labeled "city" to represent the keyword "New York" when generating the graph query 410.

In some embodiments, the node selection module 510 may select a list of nodes with top K confidences as the candidate nodes corresponding to the keyword. The graph query determination module 404 may determine the optimal node to represent the keyword further based on target node identification and path selection. The details of target node identification and path selection will be described hereafter.

The target node identification module 520 may identify at least one target node in the selected sets of nodes. The selected sets of nodes may refer to the optimal nodes or the candidate nodes selected by the node selection module 510. The target node identification module 520 may determine a query target from the natural language query 408 and identify at least one target node corresponding to the query target. The query target may be a query object. The query target may be entities or attributes. For example, for the exemplified natural language query 408 "employees who are male and over 30 years old in New York," the target node identification module 520 may determine that the query target is an attribute "employee.name".

The target node identification module 520 may identify at least one target node corresponding to the query target from the selected sets of nodes based on a semantic match between the target query and a plurality of nodes and a plurality of relationships in the graph database 401. The target node identification module 520 may identify a node with at least one matched element semantically matching the target query as the target node. For example, the node selection module 520 may identify nodes labeled "employee" and having an attribute "name," such as a first node named "Susan" and a second node named "Joe," as the target nodes corresponding to the query target "employee.name."

The target node identification module 520 may determine the query target using a target detection model. The target detection model may be any suitable model for determining the query target from the natural language query 408. The target node identification module 520 may use a target detection model trained to predict the query target based on multiple features of the natural language query 408. The multiple features may be any suitable features for determining the query target from the natural language query 408. Examples of the multiple features may comprise word feature, phrase feature, syntax feature, part-of-speech feature, or location feature. The word feature may be directed to the word level feature of the natural language query 408. The phrase feature may be directed to the phrase level feature of the natural language query 408. The target detection model may be trained based on historical query data.

In some embodiments, the target node identification module 520 may determine a set of query targets with corresponding confidences using the target detection model. The target node identification module 520 may identify at least one matched query target from the set of query targets. The identified matched query target semantically matches the schema of the graph database 401. Similarly, the target node identification module 520 may identify a query target semantically matching node properties, node labels, relationship properties and relationship labels of the schema as the matched target query. The target node identification module 520 may determine the final query target from the at least one matched query target based on the corresponding confidences of the at least one matched query target. The target node identification module 520 may determine a matched target with the highest confidence as the final query target.

For example, the target node identification module 520 may determine a set of query targets comprising a first query target "employee.name" with a confidence of 0.8, a second query target "who" with a confidence of 0.3 and a third query target "city" with a confidence of 0.5. Based on the semantic match with the schema, the target node identification module 520 may identify the first query target "employee.name" and the third query target "city" as the matched query targets. From the matched query targets, the target node identification module 520 may determine the first query target "employee.name" with a higher confidence as the final query target. In this way, the target node identification module 520 may refine the set of query targets predicted by the target detection model. The target node identification module 520 may improve the accuracy of the selected query targets and thus improve the accuracy of selecting the target nodes.

Similarly, the matched element of the selected target node may be used to represent the query target. The graph query determination module 404 may generate the graph query 410 based on the matched element of the target node. For example, the graph query determination module 404 may use the node property "employee.name" to represent the query target "employee.name" when generating the graph query 410.

Based on the selected sets of nodes corresponding to the keywords in the natural language query 408 and the at least one identified target node corresponding to the target query, the path selection module 530 may select a path traversing the selected sets of nodes corresponding to the keywords. The selected path may represent the natural language query 408. Specifically, the path selection module 530 may construct candidate paths based on the selected sets of nodes. As mentioned above, a path may refer to a collection of nodes and relationships between the nodes. A keyword may be mapped to a set of nodes and the associated keywords may be mapped to a same node. The path selection module 530 may construct a candidate path by collecting a target node from the identified target nodes and at least one other node of the selected sets of nodes. The candidate path may traverse only one node of the respective set of nodes corresponding to the respective keyword. The candidate path may also depend on the relationships between the traversed nodes.

For example, the selected sets of nodes may include a first plurality of nodes corresponding to the keyword "New York," a second plurality of nodes corresponding to the keyword "employees" and a third plurality of target nodes corresponding to the query target "employee.name." The first plurality of nodes may comprise a first node "New York" labeled "city" and a second node "New York" labeled "state." The second plurality of nodes may comprise a third node "Susan" labeled "employee" and a fourth node "Joe" labeled "employee." The plurality of target nodes may comprise the same node "Susan" and the node "Joe" because they are both labeled "employee" and have an attribute "name." In this case, the path selection module 530 may construct a first candidate path traversing the third node "Susan" and the first node "New York" labeled "city" through a relationship "lives in." The path selection module 530 may construct a second candidate path traversing the fourth node "Joe" and the second node "New York" labeled "state" through a relationship "has interest in."

The path selection module 530 may select a path from candidate paths based on similarities between the candidate paths and a plurality of paths in the graph database 401. A path of the plurality of paths may traverse a subset of the plurality of nodes in the graph database 401. In some embodiments, the plurality of paths in the graph database 401 may refer to all of the paths in the graph database 401.

In some embodiments, the path selection module 530 may select the plurality of paths for comparisons with the candidate paths based on the number of nodes in the candidate paths. For example, in order to compare the similarities between the first candidate path traversing the third node "Susan" and the first node "New York" through the relationship "lives in" and a plurality of paths in the graph database 401, the path selection module 530 may select a number of paths traversing only two nodes for comparisons with the first candidate path. In some embodiments, the path selection module 530 may select the plurality of paths for comparisons with the candidate paths based on the similarities with nodes in the candidate paths. In other words, the path selection module 530 may select the plurality of paths traversing nodes similar to the nodes in the candidate paths. For example, the path selection module 530 may select paths traversing a node "Amy" and a node "Chicago" to compare with the first candidate path. As such, the efficiency of selecting a path from the candidate paths may be improved. The similarities between nodes may be determined by different ways. For example, embeddings of nodes in the graph database 401 may be used to determine the similarities between nodes. The details of embeddings of nodes will be described hereafter.

In some embodiments, the path selection module 530 may determine a respective similarity between each candidate path and the plurality of paths in the graph database 401. The path selection 530 may select a candidate path with the highest similarity as the selected path to represent the natural language query 408. For example, the path selection 530 may determine that a first similarity between the first candidate path traversing the third node "Susan" and the first node "New York" through the relationship "lives in" and the plurality of paths is 0.9. The path selection 530 may determine that a second similarity between the second candidate path traversing the fourth node "Joe" and the second node "New York" labeled "state" through a relationship "has interest in" is 0.3. In this case, the path selection module 530 may determine the first candidate path as the selected path to represent the natural language query 408.

In some embodiments, the path selection module 530 may determine the first similarity between the first candidate path and a plurality of paths in the graph database 401 based on a node similarity between nodes in the first candidate path and nodes in the plurality of paths in the graph database 401. In some embodiments, the path selection module 530 may determine a respective initial node similarity between the first candidate path and each of the plurality of paths and identify the highest initial node similarity as the node similarity between the first candidate path and the plurality of paths. For example, the path selection module 530 may determine that the initial node similarity between the first candidate path traversing the third node "Susan" and the first node "New York" through the relationship "lives in" and a path traversing a node "Amy" and a node "Chicago" through a relationship "lives in" is 0.9. The path selection module 530 may also determine that the initial node similarity between the first candidate path traversing the third node "Susan" and the first node "New York" through the relationship "lives in" and a path traversing the third node "Susan" and a node "Beijing" through a relationship "lives in" is 0.4. In this case, the path selection module 530 may determine the node similarity between the first candidate path and the plurality of paths is 0.9.

Alternatively or in addition, the path selection module 530 may determine the first similarity between the first candidate path and a plurality of paths in the graph database 401 based on a path similarity between the first candidate path and the plurality of paths in the graph database 401. Similarly, the path selection module 530 may determine a respective initial path similarity between the first candidate path and each of the plurality of paths and identify the highest initial path similarity as the path similarity between the first candidate path and the plurality of paths. For example, the path selection module 530 may determine that the initial path similarity between the first candidate path traversing the third node "Susan" and the first node "New York" through the relationship "lives in" and a path traversing a node "Amy" and a node "Chicago" through a relationship "lives in" is 0.95. The path selection module 530 may determine that the initial path similarity between the first candidate path traversing the third node "Susan" and the first node "New York" through the relationship "lives in" and a path traversing the third node "Susan" and a node "Beijing" through a relationship "lives in" is 0.45. In this case, the path selection module 530 may determine the path similarity between the first candidate path and the plurality of paths is 0.95.

In some embodiments, the path selection module 530 may determine the node similarity as the first similarity between the first candidate path and the plurality of paths. For example, the path selection module 530 may determine the node similarity 0.9 as the first similarity between the first candidate path and the plurality of paths. In some embodiments, the path selection module 530 may determine the path similarity as the first similarity between the first candidate path and the plurality of paths. For example, the path selection module 530 may determine the path similarity 0.95 as the first similarity between the first candidate path and the plurality of paths. In some embodiments, the path selection module 530 may determine the first similarity between the first candidate path and the plurality of paths based on the node similarity and the path similarity. For example, the path selection module 530 may determine a weighted sum of the node similarity 0.9 and the path similarity 0.95 as the first similarity between the first candidate path and the plurality of paths.

In some embodiments, the path selection module 530 may determine the node similarity between nodes in the candidate paths and nodes in the plurality of paths based on embeddings of nodes in the graph database 401. The embeddings of nodes may be determined by different embedding algorithms. For example, Node2Vec may be used to compute a vector representation of a node based on random walks in the graph database 401. The vector representation of the node may be referred to as an embedding of the node. The path selection module 530 may determine the node similarity between two nodes by determining a cosine similarity between the embeddings of the two nodes.

In some embodiments, the path selection module 530 may determine the path similarity between the first candidate path and the plurality of paths based on embeddings of paths. The embeddings of paths may be determined based on a sum of the embeddings of nodes in the path and embeddings of relationships between the nodes in the path. Both the embeddings of nodes and relationships may be determined by different graph embedding algorithms. The key idea of graph embedding algorithms is to embed nodes and relationships into continuous vector spaces. The algorithms for graph embedding may comprise TransE, TransR and DisMult. The path selection module 530 may determine the path similarity between two paths by determining a cosine similarity between the embeddings of the two paths.

Based on the selected path and the query target, the query generation module 540 may generate the graph query 410. As mentioned above, the graph query 410 may include a set of clauses combined in graph query syntax. The set of clauses may include a query clause to define the query target corresponding to the natural language query 408. In addition, the set of clauses may include a path clause to define a path corresponding to the natural language query 408. In addition or alternatively, the set of clauses may include a constraint clause to define at least one constraint corresponding to the natural language query 408.

In some embodiments, the query generation module 540 may generate the graph query 410 based on the at least one matched element of nodes in the selected path. In other words, the query generation module 540 may generate the graph query 410 using at least one of the matched node label, matched node property, matched relationship label or the matched relationship property of nodes in the selected path.

In addition, the query generation module 540 may determine at least one constraint clause based on associations between matched elements related to entities or attributes and values of the matched elements in the selected path. The query generation module 540 may constrain the associations using operators comprising at least one of "=", ">", "<", ">=", "<=", or "!=". The association may be determined based on the words binding as mentioned above. For example, the query generation module 540 may use NL2SQL constraint symbol classifier to classify the associations between values and entities or attributes into operators. Examples of the constraint clauses may comprise "n.age>30," "n.gender=male," and "c.name=New York." "age," "gender," and "name" may be matched node properties related to attributes, and "30," "male," and "New York" may be respective values of the matched elements.

Figure 6:
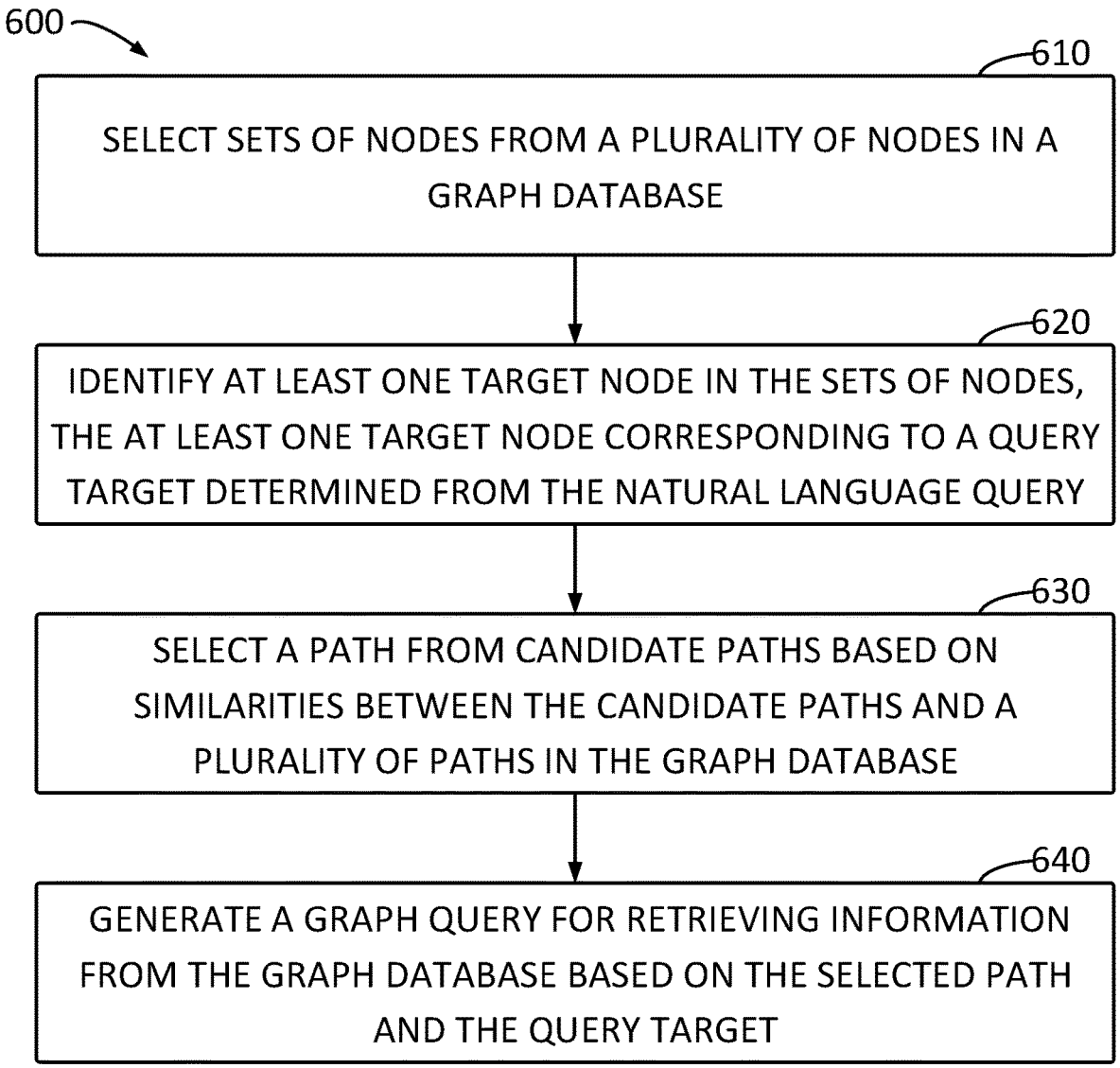
FIG. 6 depicts a flowchart of an example method for determining a graph query according to embodiments of the present disclosure.

FIG. 6 depicts a flowchart of an example method 600 for semantic search based on a graph database according to embodiments of the present disclosure. The method 600 may be implemented at the graph query determination module 404 as shown in FIG. 5. For example, at least part or all of the graph query determination module 404 may be implemented by computer system/server 100 of FIG. 1. It is to be understood that the method 600 may also comprise additional blocks (not shown) and/or may omit the illustrated blocks. The scope of the present disclosure described herein is not limited in this aspect.

Method 600 comprises selecting sets of nodes from a plurality of nodes in a graph database at operation 610. Operation 610 may be performed by a graph query determination module (such as graph query determination module 404), via a node selection module (such as, for example, node selection module 510). A set of nodes selected via operation 610 may be selected based on the set of nodes semantically matching a keyword in a natural language query (such as natural language query 408).

In some embodiments, in order to select sets of nodes from a plurality of nodes, the graph query determination module 404 may, for example, by means of the node selection module 510, identify a keyword from words in the natural language query. The keyword may be related to at least one of entities, attributes, relations, or values. In some instances, the graph query determination module 404 may, for example, by means of the node selection module 510, select a set of nodes semantically matching the keyword, where a node of the set of nodes has at least one matched element corresponding to the keyword, and the at least one matched element comprises at least one of: a matched node name, a matched node property, a matched node label, a matched relationship name of a relationship connected with the node, a matched relationship property of a relationship connected with the node, or a matched relationship label of a relationship connected with the node.

In some embodiments, in order to identify a keyword, the graph query determination module 404 may, for example, by means of the node selection module 510, identify the keyword by using Named Entity Recognition (NER). In addition or alternatively, the graph query determination module 404 may, for example, by means of the node selection module 510 identify the keyword semantically matching a schema of the graph database. The schema may define node properties and node labels of the plurality of nodes and relationship properties and relationship labels of a plurality of relationships in the graph database.

In some embodiments, in order to select a set of nodes semantically matching the keyword, the graph query determination module may, for example, by means of the node selection module 510, determine that the keyword related to relations, attributes, or values is associated with a further keyword related to entities in the natural language query. This may be determined based on at least one of syntax analysis or part of speech analysis. The graph query determination module 404 may, for example, by means of the node selection module 510 update the set of nodes using a number of nodes semantically matching both the keyword and the further keyword.

Method 600 further comprises identifying at least one target node in the sets of nodes at operation 620. The at least one target node identified via operation 620 may correspond to a query target determined from the natural language query. Operation 620 may be performed by, for example, the graph query determination module via a target node identification module (such as, for example, target node identification module 520).

In some embodiments, in order to identify at least one target node, the graph query determination module 404 may, for example, by means of the target node identification module 520, determine the query target using a target detection model. The target detection model may be trained to predict the query target based on multiple features of the natural language query 408. The multiple features may include, for example, a word feature, a phrase feature, a syntax feature, a part-of-speech feature, a location feature, etc.

In some embodiments, in order to determine the query target, the graph query determination module 404 may, for example, by means of the target node identification module 520, determine a set of query targets with corresponding confidences using the target detection model. The graph query determination module 404 may, for example, by means of the target node identification module 520, identify at least one matched query target from the set of query targets. The at least one matched query target may semantically match a schema of the graph database, the schema defining node properties and node labels of the plurality of nodes and relationship properties and relationship labels of a plurality of relationships in the graph database. The graph query determination module 404 may, for example, by means of the target node identification module 520, determine the query target from the at least one matched query target based on the confidences.

Method 600 further comprises, at operation 630, selecting a path from candidate paths based on similarities between the candidate paths and a plurality of paths in the graph database 401. A candidate path at least traverses a target node of the at least one target node and at least one node from the sets of nodes. A path of the plurality of paths traverses a subset of the plurality of nodes. Operation 630 may be performed by the graph query generation module via a path selection module (such as, for example, patch selection module 530).

In some embodiments, in order to select a path from candidate paths, the graph query generation module 404 may, for example, by means of the path selection module 530, determine a first similarity between a first candidate path and the plurality of paths based on least one of: a node similarity between nodes in the first candidate path and nodes in the plurality of paths; or a path similarity between the first candidate path and the plurality of paths.

In some embodiments, in order to determine the first similarity, the graph query generation module 404 may, for example, by means of the path selection module 530, determine the node similarity based on similarities between embeddings of the nodes in the first candidate path and embeddings of the nodes in the plurality of paths. The graph query generation module 404 may, for example, by means of the path selection module 530, determine the path similarity based on similarities between an embedding of the first candidate path and embeddings of the plurality of paths. The embedding of the first candidate path may be based on a sum of the embeddings of nodes in the first candidate path and embeddings of relationships between the nodes in the first candidate path. An embedding of a path of the plurality of paths may be based on a sum of embeddings of nodes in the respective path and embeddings of relationships between the nodes in the respective path.

Method 600 further comprises generating a graph query for retrieving information from the graph database based on the selected path and the query target at operation 640. Operation 640 may be performed by the graph query generation module 404 via query generation module 540.

In some embodiments, in order to generate the graph query 410, the graph query generation module 404 may, for example, by means of the query generation module 540, generate the graph query based on the at least one matched element of nodes in the selected path.

In some embodiments, in order to generate the graph query 410, the graph query generation module 404 may, for example, by means of the query generation module 540, constrain associations between matched elements related to entities or attributes and values of the matched elements in the selected path using operators. The operators may comprise at least one of "=", ">", "<", ">=", "<=", or "!=".

It can be seen that embodiments of the present disclosure provide a solution for semantic search based on a graph database. This solution allows determining a graph query based on a natural language query from users and retrieving information from a graph database using the determined graph query. Thus the accuracy and efficiency of semantic search based on a graph database may be improved.

It should be noted that the processing of semantic search based on a graph database according to embodiments of this disclosure could be implemented by computer system/server 100 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented, operable on a computer system, the method comprising:
   identifying, automatically by the computer system, a keyword from words in a natural language query;
   selecting, automatically by the computer system, a first set of nodes semantically matching the keyword, a first node of the first set of nodes having at least one matched element corresponding to the keyword, wherein the selecting of the first set of nodes comprises:
      determining that the keyword is associated with a further keyword related to entities in the natural language query based on at least one of syntax analysis or part of speech analysis;
      binding words in the natural language query based on the determining that the keyword is associated with a further keyword; and
      updating the first set of nodes using a number of nodes semantically matching both the keyword and the further keyword based on the binding words in the natural language query;
   determining, automatically by the computer system, a query target from the natural language query;
   identifying, automatically by the computer system, one or more target nodes included in the first set of nodes, the one or more target nodes corresponding to the query target;
   selecting, automatically by the computer system, a path from candidate paths based on similarities between the candidate paths and a plurality of paths in the graph database, wherein:
      a candidate path traverses at least one target node of the one or more target nodes and at least one node from the first set of nodes; and
      a path of the plurality of paths traverses a subset of the plurality of nodes; and
   generating, automatically by the computer system, a graph query for retrieving information from the graph database based on the selected path and the query target;
   wherein the generating the graph query further comprises creating clauses in the graph query that correspond to the natural language query.

2. The method of claim 1, wherein the keyword is related to at least one of entities, attributes, relations, or values.

3. The method of claim 1, wherein the at least one matched element is selected from the group consisting of:
   a matched node name;
   a matched node property;
   a matched node label;
   a matched relationship name of a relationship connected with the node;
   a matched relationship property of a relationship connected with the node; and
   a matched relationship label of a relationship connected with the node.

4. The method of claim 1, wherein the identifying the keyword includes identifying the keyword semantically matching a schema of the graph database, the schema defining node properties and node labels of the plurality of nodes and relationship properties and relationship labels of a plurality of relationships in the graph database.

5. The method of claim 1, wherein the identifying the one or more target nodes includes determining the query target using a target detection model, the target detection model being trained to predict the query target based on multiple features of the natural language query.

6. The method of claim 5, wherein the determining the query target includes:
   determining a set of query targets with corresponding confidences using the target detection model, wherein each corresponding confidence relates one of the set of query targets with at least one keyword from the natural language query;
   identifying at least one matched query target from the set of query targets, the at least one matched query target semantically matching a schema of the graph database, the schema defining node properties and node labels of the plurality of nodes and relationship properties and relationship labels of a plurality of relationships in the graph database; and
   determining the query target from the at least one matched query target based on the confidences.

7. The method of claim 1, further comprising:
   determining a path similarity based on similarities between an embedding of a first candidate path and embeddings of the plurality of paths, wherein:
      the embedding of the first candidate path is based on a first sum of embeddings of nodes in the first candidate path and embeddings of relationships between the nodes in the first candidate path; and
      an embedding of a path of the plurality of paths is based on a second sum of embeddings of nodes in the respective path and embeddings of relationships between the nodes in the respective path; and
   determining a first cosine similarity between the first candidate path and the plurality of paths based on the path similarity, wherein the selecting the path from the candidate paths is based on the first cosine similarity.

8. The method of claim 7, further comprising:
   determining a node similarity based on similarities between embeddings of nodes in a first candidate path and embeddings of nodes in the plurality of paths; and
   determining a first similarity between the first candidate path and the plurality of paths based on the path similarity, wherein the selecting a path from candidate paths is based on the first similarity.

9. The method of claim 1, wherein the generating the graph query based on the selected path and the query target includes generating the graph query based on the at least one matched element of nodes in the selected path.

10. The method of claim 4, further comprising discarding entities that do not include node properties or node labels of the schema.

11. A system comprising:
   a memory; and
   a central processing unit (CPU) coupled to the memory, the CPU configured to:
      identify, automatically by the CPU, a keyword from words in a natural language query;
      select, automatically by the CPU, a first set of nodes semantically matching the keyword, a first node of the first set of nodes having at least one matched element corresponding to the keyword, wherein the selection of the first set of nodes comprises:
         determine that the keyword is associated with a further keyword related to entities in the natural language query based on at least one of syntax analysis or part of speech analysis;

bind words in the natural language query based on the determining that the keyword is associated with a further keyword; and update the first set of nodes using a number of nodes semantically matching both the keyword and the further keyword based on the binding words in the natural language query;

determine, automatically by the CPU, a query target from the natural language query;

identify, automatically by the CPU, one or more target nodes included in the first set of nodes, the one or more target nodes corresponding to the query target;

select, automatically by the CPU, a path from candidate paths based on similarities between the candidate paths and a plurality of paths in the graph database, wherein:

a candidate path traverses at least one target node of the one or more target nodes and at least one node from the first set of nodes; and a path of the plurality of paths traverses a subset of the plurality of nodes; and generate, automatically by the CPU, a graph query for retrieving information from the graph database based on the selected path and the query target;

wherein the generating the graph query further comprises creating clauses in the graph query that correspond to the natural language query.

12. The system of claim 11, wherein the keyword is related to at least one of entities, attributes, relations, or values.

13. The system of claim 11, wherein the at least one matched element is selected from the group consisting of:
a matched node name;
a matched node property;
a matched node label;
a matched relationship name of a relationship connected with the node;
a matched relationship property of a relationship connected with the node; and
a matched relationship label of a relationship connected with the node.

14. The system of claim 11, wherein the identifying the keyword includes identifying the keyword semantically matching a schema of the graph database, the schema defining node properties and node labels of the plurality of nodes and relationship properties and relationship labels of a plurality of relationships in the graph database.

15. The system of claim 11, wherein the identifying the one or more target nodes includes determining the query target using a target detection model, the target detection model being trained to predict the query target based on multiple features of the natural language query.

16. The system of claim 15, wherein the determining the query target includes:
determining a set of query targets with corresponding confidences using the target detection model, wherein each corresponding confidence relates one of the set of query targets with at least one keyword from the natural language query;
identifying at least one matched query target from the set of query targets, the at least one matched query target semantically matching a schema of the graph database, the schema defining node properties and node labels of the plurality of nodes and relationship properties and relationship labels of a plurality of relationships in the graph database; and
determining the query target from the at least one matched query target based on the confidences.

17. The system of claim 11, wherein the CPU is further configured to:
determine a path similarity based on similarities between an embedding of a first candidate path and embeddings of the plurality of paths, wherein:
the embedding of the first candidate path is based on a first sum of embeddings of nodes in the first candidate path and embeddings of relationships between the nodes in the first candidate path; and
an embedding of a path of the plurality of paths is based on a second sum of embeddings of nodes in the respective path and embeddings of relationships between the nodes in the respective path; and
determine a first cosine similarity between the first candidate path and the plurality of paths based on the path similarity, wherein the selecting the path from the candidate paths is based on the first cosine similarity.

18. The system of claim 17, wherein the CPU is further configured to:
determine a node similarity based on similarities between embeddings of nodes in a first candidate path and embeddings of nodes in the plurality of paths; and
determine a first similarity between the first candidate path and the plurality of paths based on the path similarity, wherein the selecting the path from the candidate paths is based on the first similarity.

19. The system of claim 11, wherein determining the query target includes:
determine a set of query targets with corresponding confidences using the target detection model, wherein each corresponding confidence relates one of the set of query targets with at least one keyword from the natural language query;
identify at least one matched query target from the set of query targets, the at least one matched query target semantically matching a schema of the graph database, the schema defining node properties and node labels of the plurality of nodes and relationship properties and relationship labels of a plurality of relationships in the graph database; and
determine the query target from the at least one matched query target based on the confidences.

20. A computer program product, the computer program product comprising a computer readable storage medium having program instructions embodied therewith, the program instructions executable by a computer to cause the computer to:
identify, automatically by the computer, a keyword from words in a natural language query;
select, automatically by the computer, a first set of nodes semantically matching the keyword, a first node of the first set of nodes having at least one matched element corresponding to the keyword, wherein the selection of the first set of nodes comprises:
determine that the keyword is associated with a further keyword related to entities in the natural language query based on at least one of syntax analysis or part of speech analysis;
bind words in the natural language query based on the determining that the keyword is associated with a further keyword; and update the first set of nodes using a number of nodes semantically matching both the keyword and the further keyword based on the binding words in the natural language query;

determine, automatically by the computer, a query target from the natural language query;

identify, automatically by the computer, one or more target nodes included in the first set of nodes, the one or more target nodes corresponding to the query target;

select, automatically by the computer, a path from candidate paths based on similarities between the candidate paths and a plurality of paths in the graph database, wherein:

a candidate path traverses at least one target node of the one or more target nodes and at least one node from the first set of nodes; and a path of the plurality of paths traverses a subset of the plurality of nodes; and generate, automatically by the computer, a graph query for retrieving information from the graph database based on the selected path and the query target;

wherein the generating the graph query further comprises creating clauses in the graph query that correspond to the natural language query.

\* \* \* \* \*